US006899190B2

(12) United States Patent
Bordini

(10) Patent No.: US 6,899,190 B2
(45) Date of Patent: May 31, 2005

(54) TRACTOR POWERTRAIN INCLUDING PLURALITY OF STRUCTURAL CASINGS

(75) Inventor: Giorgio Bordini, Santa Cruz de Tenerife (ES)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/281,606

(22) Filed: Oct. 28, 2002

(65) Prior Publication Data

US 2003/0102174 A1 Jun. 5, 2003

(30) Foreign Application Priority Data

Nov. 30, 2001 (IT) .................................... BO2001A0734

(51) Int. Cl.⁷ .............................................. B60K 6/02
(52) U.S. Cl. ..................... 180/65.2; 180/65.4; 180/65.6; 180/53.6
(58) Field of Search ............................ 180/65.1, 65.2, 180/65.3, 65.4, 53.6, 376, 378, 379, 65.6; 280/65.1, 65.2, 65.3, 65.4

(56) References Cited

U.S. PATENT DOCUMENTS

| | | | | |
|---|---|---|---|---|
| 5,513,719 A | * | 5/1996 | Moroto et al. ............. | 180/65.4 |
| 5,934,395 A | * | 8/1999 | Koide et al. ............... | 180/65.2 |
| RE36,678 E | * | 5/2000 | Moroto et al. ............. | 180/65.4 |
| 6,121,707 A | * | 9/2000 | Bell et al. ................... | 310/179 |
| 6,251,037 B1 | * | 6/2001 | Baumgaertner et al. ....... | 475/2 |
| 6,338,391 B1 | * | 1/2002 | Severinsky et al. ........ | 180/65.2 |
| 6,453,222 B1 | * | 9/2002 | Lasson et al. ............... | 701/22 |
| 6,476,571 B1 | * | 11/2002 | Sasaki ........................ | 318/139 |
| 6,493,611 B2 | * | 12/2002 | Yoshino et al. .............. | 701/22 |
| 6,581,706 B2 | | 6/2003 | Bordini | |
| 6,637,294 B2 | * | 10/2003 | Nemoto ..................... | 74/730.1 |
| 6,656,082 B1 | * | 12/2003 | Yamada et al. .............. | 477/5 |

FOREIGN PATENT DOCUMENTS

| EP | 1 199 204 A1 | 4/2002 |
|---|---|---|
| EP | 1 317 050 A2 | 6/2003 |

* cited by examiner

Primary Examiner—Christopher P. Ellis
Assistant Examiner—Brian Swenson
(74) Attorney, Agent, or Firm—John William Stader; Collin A. Webb

(57) ABSTRACT

A hybrid power train for farm tractors, wherein the elements defining at least one of the electric machines are housed in a structural casing formed in one piece. The structural casing forms an integral part of the supporting structure of the tractor in the form of a half-shell open on one side, so as to permit assembly of an insulating element, a stator, and a shaft fitted with a respective rotor to form the electric machine part of the hybrid power train. The diesel engine of the agricultural tractor is mechanically connected to the Power take-off mechanism by routing the PTO shaft through a number of hollow shafts for transmitting power from the diesel engine to and from the two electric machines by means of a conventional epicyclic gear train.

8 Claims, 1 Drawing Sheet

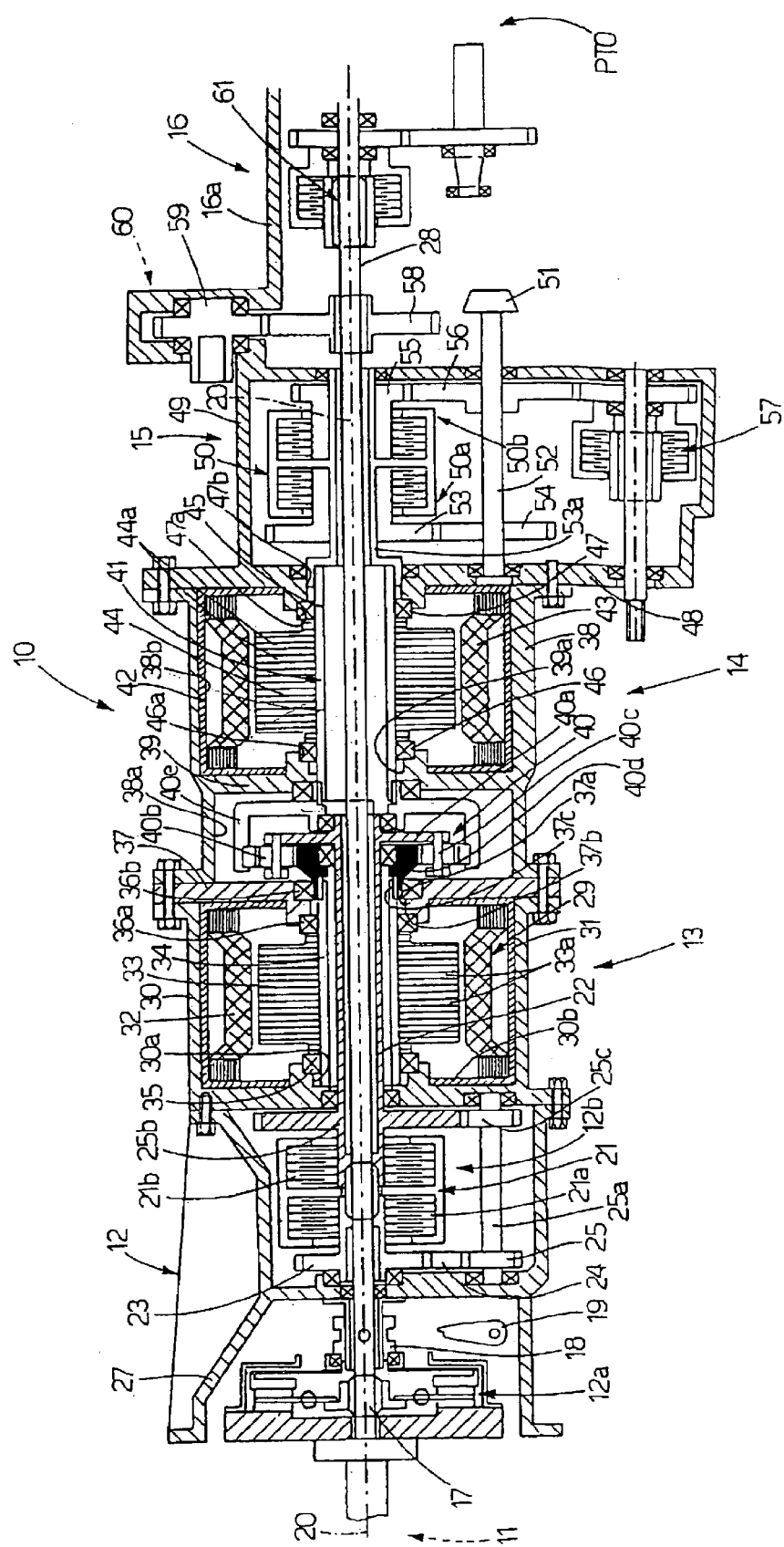

TRACTOR POWERTRAIN INCLUDING PLURALITY OF STRUCTURAL CASINGS

BACKGROUND OF THE INVENTION

The present invention relates to a hybrid power train coupling mechanical and electrical power and, more particularly, to forming the hybrid power train in a configuration that can be utilized in agricultural tractors.

Hybrid power trains, in which part of the energy produced by an internal combustion engine is converted into electric energy to improve control of the power train, are known in the art. A hybrid power train of this type is described and claimed in European Patent Application No. EP-01203947.5, which published as EP 1 199 204 and corresponds to U.S. Pat. No. 6,581,706, the contents of which are hereby incorporated herein by reference. One of the problems posed by this type of power train is the bulk of the system, which generally renders the hybrid power train system unsuitable for use on farm tractors.

Moreover, known hybrid power trains are difficult to produce and involve a large number of component parts, thus increasing the cost and complexity as compared with conventional power trains for agricultural tractors. Known hybrid engines, in fact, comprise a housing containing the two electric motors, each of which in turn comprises a respective casing.

SUMMARY OF THE INVENTION

It is an object of the present invention to provide a hybrid power train capable of practical utilization in an agricultural tractor.

It is an advantage of this invention to provide a hybrid power train that is more compact and easier to manufacture than heretofore known in the art.

It is a feature of this invention to provide a hybrid power train system in which the known electric motor casings are replaced with structural casings.

It is another advantage of this invention that the structural casings replacing the known electric motor casings are made of cast iron.

It is still another advantage of this invention that the formation of the structural casings from cast iron enables the power of the electric motors to be increased for a given size of the power train.

It is another feature of this invention that the combining an increased electric power and compactness of the structural casings permit the utilization of the hybrid power trains on farm tractors.

It is another object of this invention to provide a solution to the problem of connecting the diesel engine mechanically to the power take-off mechanism on an agricultural tractor.

It is yet another advantage of this invention that by using a small number of easy-to-assemble component parts that manufacture of the electric machines for the hybrid power train is greatly simplified.

It is still another feature of this invention that the disposal of heat generated by the electric machines can be accomplished either directly to the outside or by means of coolant circulated in channels formed in the structural casings.

It is yet another feature of this invention to connect the diesel engine of an agricultural tractor to the PTO by routing the PTO shaft through a number of hollow shafts for transmitting power from the diesel engine and to and from the two electric machines by means of a conventional epicyclic gear train.

These and other objects, features and advantages are accomplished according to the instant invention by providing a hybrid power train for farm tractors, wherein the elements defining at least one of the electric machines are housed in a structural casing formed in one piece. The structural casing forms an integral part of the supporting structure of the tractor in the form of a half-shell open on one side, so as to permit assembly of an insulating element, a stator, and a shaft fitted with a respective rotor to form the electric machine part of the hybrid power train. The diesel engine of the agricultural tractor is mechanically connected to the Power take-off mechanism by routing the PTO shaft through a number of hollow shafts for transmitting power from the diesel engine to and from the two electric machines by means of a conventional epicyclic gear train.

BRIEF DESCRIPTION OF THE DRAWINGS

The advantages of this invention will become apparent upon consideration of the following detailed disclosure of the invention, especially when taken in conjunction with the accompanying drawing, wherein:

The FIGURE is schematic cross-sectional view of a hybrid power train for an agricultural tractor incorporating the principles of the instant invention.

DETAILED DESCRIPTION OF THE PREFERRED EMBODIMENT

A power train 10, which is a hybrid type, is formed of a diesel engine 11 (not shown) for rotating a shaft 17; and a number of units 12, 13, 14, 15, 16, the functions of which are explained in detail below. Working from left to right on the drawing, a connecting/disconnecting unit 12 is depicted. Unit 12 is known in the art and is formed of a first stage 12a for connecting and disconnecting the diesel engine 11 to or from the shaft 17. The first stage 12a is engaged or released by the operator by means of a sleeve 18 and a lever 19 operated by conventional actuating means (not shown). To engage and release the first stage 12a, the sleeve 18 is moved in a direction defined by an axis 20, which is also the longitudinal axis of symmetry of the shaft 17.

Downstream from first stage 12a, unit 12 further includes a second stage 12b, also known in the art and formed of a clutch device 21 for connecting and disconnecting the shaft 17 to or from a hollow shaft 22. By activating a portion 21b of clutch device 21 (by known means not shown), shaft 22, being integral with shaft 17, is rotated in the same direction as the diesel engine 11. Conversely, by activating a portion 21a of clutch device 21, the power generated by diesel engine 11 is transmitted to shaft 22 in the opposite direction to before by a set of three intermeshing gears 23, 24, 25, of which gear 24 is an idler gear, a shaft 25a, and gears 25b and 25c. Both stages 12a, 12b are supported in known manner by a support 27 preferably, though not necessarily, made of cast iron. Hollow shaft 22 houses, coaxially, a shaft 28 for powering a PTO; and shafts 17, 22, 28 all have the same longitudinal axis of symmetry 20.

Unit 13 includes a first electric machine 29 housed in a structural casing 30, which also houses an electric insulating element 31 on which rests a conventional stator 32. A known rotor 33 completes electric machine 29, and is defined by a pack of laminations 33a fitted to a shaft 34 supported on two ball bearings 35, 36a. Bearing 35 is housed in a seat 30a formed in a wall 30b of the structural casing, and bearing 36a is housed in a seat 37a formed in a plate 37 at an opening 37c.

A structural casing 30, also advantageously, though not necessarily, made of cast iron, is bolted by known means on one side to support 27, and on the other side thereof to both plate 37 and a structural casing 38 forming part of the next unit 14. Being open on the side facing unit 14, the structural casing 30 permits easy assembly of the component parts of electric machine 29. Two chambers 38a, 38b are defined inside structural casing 38 of unit 14, and are separated by a wall 39 having an opening 39a. The first chamber 38a houses an epicyclic gear train 40, the component parts of which and the way in which they are connected to the other parts of power train 10 are explained in detail below.

Structural casing 38, and in particular the second chamber 38b, houses elements forming part of a second electric machine 41, which is generally formed of the same component parts as first electric machine 29. Accordingly, the second electric machine 41 includes an electric insulating element 42, on which rests a conventional stator 43, and is completed by a rotor 44 fitted to a shaft 45 supported on two ball bearings 46, 47. Shaft 45 is also hollow and coaxial with axis 20, and rotor 44 comprises a pack of laminations 44a. Since the second chamber 38b is also open, at least on one side, outwardly towards the next unit 15, the component parts of second electric machine 41 are assembled easily inside second chamber 38b.

As stated above, an actuating means (not shown) operates lever 19 to engage or release the sleeve 18, which can be released automatically when power train 10 is running, or manually by the user operating a lever (not shown) or a pedal (not shown) to start directly in fully electric mode when the power train 10 is off. When the power train 10 is running, in fact, the tractor hydraulic circuit (not shown) is already pressurized so that enough hydraulic power is available to automatically release sleeve 18 to switch to the fully electric mode. Conversely, when the power train 10 is off, no hydraulic power is available to start directly in fully electric mode, so a manual control must be provided to release sleeve 18. Otherwise, operation of electric machines 29, 41 would rotate shaft 17, thus resulting in undesired start-up of the diesel engine 11.

The epicyclic gear train 40 is formed of a planet carrier 40a integral with hollow shaft 22; and a number of planet wheels 40b, each connected to planet carrier 40a by respective spindle 40c. The epicyclic gear train 40 also includes a sun gear 40d integral with hollow shaft 34 of electric machine 29; and a ring gear 40e integral with hollow shaft 45 of second electric machine 41. By means of known mechanisms also described in EP-01203947.5, which corresponds to U.S. Pat. No. 6,581,706, the description of which is herein incorporated by reference, the epicyclic gear train 40 divides and recombines the mechanical power supplied by diesel engine 11 and the electric power produced by electric machines 29, 41.

The hollow shaft 45 of the second electric machine 41 provides for actually adding the mechanical energy transmitted to the shaft 45 by the ring gear 40e of the epicyclic gear train 40 to the rotational energy supplied by rotor 44. As stated, structural casing 30, plate 37, and structural casing 38 are preferably made of cast iron and connected to one another by known fastening means, such as a number of bolts and respective nuts, so that the structural whole housing the two electric machines 29, 41 is extremely compact and solid. The bearing 46 is housed in a seat 46a formed in wall 39, close to opening 39a; bearing 47 is housed in a seat 47a formed in a wall 48 of the next unit 15; and wall 28 has an opening 47b.

Unit 15 includes a structural casing 49 in turn forming the wall 48 and housing a conventional HI/LO transmission 50. The HI/LO transmission 50 rotates a pinion 51 of the rear wheel differential (not shown). More specifically, HI/LO transmission 50 includes two clutch devices 50a, 50b, both for rotating a shaft 52 to which the pinion 51 is fitted. The clutch device 50a substantially is formed of a clutch and two gears 53, 54, gear 54 being fitted to shaft 52. Similarly, device 50b is formed of a clutch and two gears 55, 56. Gear 56 is also fitted to shaft 52, whereas gears 53 and 55 are fitted to a hollow shaft 53a.

The angular speed of pinion 51, therefore, depends on which of the two clutches is engaged, and, therefore, on which of the two pairs of gears 53, 54 or 55, 56 rotates shaft 52. In other words, when clutch device 50a is engaged, HI mode is engaged and pinion 51 rotates at a high angular speed; and, to rotate pinion 51 at low speed, clutch device 50a is simply released and device 50b engaged to engage LO mode. Gear 56 always transmits motion to a known device 57 for transmitting motion to the front wheels (not shown). As shown in the accompanying drawing, PTO shaft 28 rotates a gear 58 meshing with a gear 59 for transmitting motion to a shaft controlling auxiliary facilities 60 (shown only partly).

At unit 16, shaft 28 is fitted with a PTO clutch 61; and unit 16 is also housed in a structural casing 16a. Structural casings 49 and 16a are also advantageously made of cast iron.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A hybrid power train for use on agricultural tractors and including a diesel engine and at least two electric machines, said diesel engine and said at least two electric machines being connected mechanically to a device for dividing and recombining the power generated by said diesel engine and power associated with said electric machines, so that said electric machines function as both generators and motors, the improvement comprising:

said power train including at least one of said electric machines and being housed in a structural casing defining the structural body of the tractor, said structural casing being formed in one piece and open on one side so as to permit assembly of an insulating element, a stator, and a shaft fitted with a respective rotor to form said at least one of said electric machines; and a support and a number of structural casings made of cast iron, wherein said diesel engine is connected mechanically by a further shaft to a planet carrier of said device for dividing and recombining the power generated by said diesel engine and associated with said electric machines, a first shaft of a first of said electric machines being connected mechanically to a sun gear of said device for dividing and recombining the power generated by said diesel engine and associated with said electric machines, a second shaft of a second of said electric machines being connected mechanically to a ring gear of said device for dividing and recombining the power generated by said diesel engine and associated with said electric machines.

2. A tractor powertrain comprising:

a diesel engine;

a support comprising a divider wall separating a pair of cavities, the divider wall defining an aperture and being adapted to receive a first bearing;

a first structural casing including a closed end and an open end, the closed end (i) being fastened to the support, (ii) defining an aperture, (iii) being adapted to receive a bearing in the aperture and (iv) comprising a raised collar coaxial with the aperture, the raised collar adapted to receive a bearing thereon;

a plate fastened to the open end of the first structural casing, the plate comprising a collar, which defines an aperture and is adapted to receive a pair of bearings in a spaced relationship;

a second structural casing comprising a casing divider wall dividing the second structural casing into first and second cavities, the casing divider wall including a collar adapted to receive a pair of bearings in a spaced relationship, the second structural casing being fastened to the plate; and a third structural casing including a closed end fastened to the second structural casing, the closed end including a collar adapted to receive a pair of spaced bearings.

3. A tractor powertrain according to claim 2, further comprising a first electrical machine disposed within the first structural casing, an epicyclic gear train disposed within the first cavity of the second structural casing, and a second electrical machine disposed within the second cavity of the second structural casing.

4. A tractor powertrain according to claim 2, further comprising a first bearing disposed in the aperture of the divider wall; a second bearing disposed in the aperture of the first structural casing; a third bearing disposed in the collar of the first structural casing; fourth and fifth bearings disposed in a spaced relationship in the collar of the plate; sixth and seventh bearings disposed in the casing divider wall of the second structural casing; eighth and ninth bearings disposed in the collar of the closed end of the third structural casing.

5. A tractor powertrain according to claim 4, further comprising a first shaft; a second, hollow shaft disposed coaxially with and around the first shaft; and a third, hollow shaft disposed coaxially with and around the first and second shafts, the first shaft being journelled in the first bearing, the second shaft being journelled in the second bearing and the third shaft being journelled in the third and fourth bearings.

6. A tractor powertrain according to claim 5, further comprising a fourth, hollow shaft disposed coaxially with and around the first shaft, the fourth shaft being journelled in the seventh and eighth bearings.

7. A tractor powertrain according to claim 6, further comprising first and second electrical machines, each comprising a stator and a rotor, the rotor of the first electrical machine being fixed to the third shaft and the rotor of the second electrical machine being fixed to the fourth shall.

8. A tractor powertrain according to claim 6, further comprising a fifth, hollow shaft disposed coaxially with and around the first shaft, the fifth shaft being journelled in the ninth bearing.

* * * * *